US008705736B2

(12) United States Patent
Haas et al.

(10) Patent No.: US 8,705,736 B2
(45) Date of Patent: Apr. 22, 2014

(54) IMAGE ENCRYPTION FOR PRINT-AND-SCAN CHANNELS USING PIXEL POSITION PERMUTATION

(75) Inventors: Bertrand Haas, New Haven, CT (US); Ahmet E. Dirik, Brooklyn, NY (US); Yassir Nawaz, Hamden, CT (US)

(73) Assignee: Pitney Bowes Inc., Stamford, CT (US)

( * ) Notice: Subject to any disclaimer, the term of this patent is extended or adjusted under 35 U.S.C. 154(b) by 1320 days.

(21) Appl. No.: 12/317,955

(22) Filed: Dec. 31, 2008

(65) Prior Publication Data

US 2010/0169649 A1 Jul. 1, 2010

(51) Int. Cl.
*G09C 3/00* (2006.01)
(52) U.S. Cl.
USPC ............................................. 380/54; 380/55
(58) Field of Classification Search
USPC ....................................................... 380/54, 55
See application file for complete search history.

(56) References Cited

U.S. PATENT DOCUMENTS

| | | | | |
|---|---|---|---|---|
| 5,321,749 | A * | 6/1994 | Virga | 380/243 |
| 5,612,524 | A | 3/1997 | Sant'Anselmo et al. | |
| 6,064,738 | A * | 5/2000 | Fridrich | 380/28 |
| 2001/0016054 | A1 * | 8/2001 | Banker et al. | 382/112 |
| 2002/0003905 | A1 * | 1/2002 | Sato et al. | 382/240 |
| 2003/0112471 | A1 * | 6/2003 | Damera-Venkata et al. | 358/3.28 |
| 2005/0108542 | A1 * | 5/2005 | Kirovski et al. | 713/176 |
| 2006/0120619 | A1 * | 6/2006 | Avidan et al. | 382/276 |
| 2006/0177060 | A1 * | 8/2006 | Johnson et al. | 380/255 |
| 2007/0076239 | A1 | 4/2007 | Haas et al. | |
| 2007/0118482 | A1 * | 5/2007 | Tuyls et al. | 705/62 |
| 2010/0092084 | A1 * | 4/2010 | Perronnin et al. | 382/170 |

OTHER PUBLICATIONS

Mirta et al., A new Image Encryption Approach using Combinational Permutation Techniques., Int. J. Comp. Sci., V1, No. 2, 2006.*
Usman et al., "Medical Image Encryption Based on Pixel Arrangement and Random Permutation for Transmission Security", IEEE, 2007.*
Nini et al., "Pixel Permutation of a color Image based on a Projection from a Rotated View", Int. J. Digital Content Tech. and its Appl., V5, No. 4, Apr. 2011.*
Maniccam et al. , "Image and Video encryption using SCAN Patterns", Pattern Recognition 37, 2004.*
Hussain et al., Key Based random Permutation (KBRP), J. Computer Science, V2, No. 5, 2006.*
Digital Image Processing, Second Edition, Rafael C. Gonzalez, Richard E. Woods, TA1632.G66, 621.3-dc21, 2001.

* cited by examiner

*Primary Examiner* — Teshome Hailu
(74) *Attorney, Agent, or Firm* — Michael J. Cummings; Charles R. Malandra, Jr.; Steven J. Shapiro

(57) ABSTRACT

An image encryption method that includes receiving image data based on an image, wherein the image data comprises a plurality of pixel values, and permuting a plurality of, and preferably all of, the pixel values using at least a secret key to create permuted image data. Also, an image decryption method that includes scanning a printed image to create scanned image data. The printed image is generated from permuted image data that is generated by permuting a plurality of first pixel values of first image data using at least a secret key, obtaining a plurality of second pixel values from the scanned image data, and reverse-permuting a plurality of the second pixel values using at least the secret key to create reverse-permuted scanned image data.

21 Claims, 13 Drawing Sheets

IMAGE ENCRYPTION FOR PRINT-AND-SCAN CHANNELS USING PIXEL POSITION PERMUTATION

FIELD OF THE INVENTION

The present invention relates to protection of images, and in particular to a robust image encryption and decryption methodology for print-and-scan channels that employs pixel position permutation.

BACKGROUND OF THE INVENTION

Many applications involving valuable documents, such as passports, ID cards, bank notes and checks, and diplomas or similar certificates, require a mechanism to prove the authenticity and integrity of the document. There are also a number of applications where valuable images must be securely stored and/or transmitted electronically. Classic image encryption has in the past been used for these purposes. The problem with classic image encryption, where the image data itself is encrypted using one or more encryption keys and an encryption algorithm, is that changing even one bit of the encrypted message makes it impossible to obtain the original message. As a result, classic encryption is not suitable for uses that employ noisy channels such as print-and-scan channels without also employing error correction codes. In addition, in the prior art, two-dimensional barcodes have been used to store images in encrypted form in hard copy. However, if a relatively large image needs to be stored, the resulting two-dimensional barcode will also need to be significantly large. This is can be problematic, as the space that is available for printing such barcodes is often limited. If the image data is compressed in order to make it fit into a smaller two-dimensional barcode (such as a standard Datamatrix having a fixed data capacity), this can also be problematic, as data compression will likely be lossy and degrade the quality of the image. Moreover, two-dimensional barcodes do not provide any copy prevention mechanisms. Such copy prevention mechanisms are important for fraud prevention purposes, and adding them to two-dimensional barcodes would increase application complexity and costs and printing area.

Thus, there is room for improvement in the field of image encryption for noisy channels such as print-and-scan channels.

SUMMARY OF THE INVENTION

In one embodiment, an image encryption method is provided that includes receiving image data based on an image, wherein the image data comprises a plurality of pixel values, and permuting a plurality of, and preferably all of, the pixel values using at least a secret key to create permuted image data. Preferably, the permuting comprises randomly permuting the image data using the secret key, an initialization vector and a pseudo random number generator to create the permuted image data.

The method may further include receiving original image data based on the image and adjusting the image histogram of the original image data to generate adjusted image data, the image data being based on the adjusted image data. For example, the image data may actually be the adjusted image data itself.

The adjusting of the image histogram may include applying histogram specification, such as histogram equalization or histogram matching to any other grey level distribution, to the original image data. Alternatively, the adjusting of the image histogram may include applying histogram equalization to the original image data to produce equalized data and intensity shifting the equalized data to produce the adjusted image data. In addition, the method may further include concatenating pixel data to the adjusted image data to generate the image data.

In one particular, preferred embodiment, the method further includes applying a synchronization grid to the permuted image data to generate synchronized image data, wherein the printed image is based on the synchronized image data. The synchronization grid may include a plurality of synchronization elements, such as, without limitation, synchronization dots. The method may also further include scaling the synchronized image data to produce scaled image data, and then printing a printed image based on the scaled image data.

In another embodiment, an image decryption method is provided that includes scanning a printed image to create scanned image data, wherein the printed image being generated from permuted image data generated by permuting a plurality of first pixel values of first image data using at least a secret key, obtaining a plurality of second pixel values from the scanned image data, and reverse-permuting a plurality of the second pixel values using at least the secret key to create reverse-permuted scanned image data. Preferably, the permuted image data is generated by pseudo-randomly permuting the plurality of first pixel values using the secret key, an initialization vector and a pseudo random number generator, and preferably the reverse-permuting comprises reverse-permuting the plurality of the second pixel values using the secret key and the initialization vector.

The method may further include adjusting the image histogram of the reverse-permuted scanned image data to generate adjusted scanned image data.

In one particular embodiment, the method includes applying a noise analysis to one of the reverse-permuted scanned image data or second data that is based on the reverse-permuted scanned image data to determine a noise power, determining whether the noise power exceeds a predetermined threshold, and if it is determined that the noise power exceeds the predetermined threshold, determining that the printed image is a duplicate. Such noise analysis can be done by a de-noising algorithm at the same time that de-noising of the image is preformed.

In another particular embodiment, the printed image includes a first synchronization grid having a plurality of first synchronization elements, and the scanned image data includes a second synchronization grid having a plurality of second synchronization elements. In this embodiment, the method further includes detecting a plurality of second synchronization elements, wherein the obtaining a plurality of second pixel values comprises using the plurality of second synchronization elements to identify a plurality of second pixel locations, each of the second pixel locations corresponding to a respective one of the second pixel values. The obtaining a plurality of second pixel values may include, for each of the plurality of second pixel locations, averaging (e.g., a simple average or a weighted average) pixel data from the scanned image data that is associated with the second pixel location to determine the second pixel value that corresponds to the second pixel location. Furthermore, the averaging may include averaging pixel data from the scanned image date that is within a predetermined radius of the second pixel location. Also, the detecting a plurality of second synchronization elements may employ normalized cross-correlation using first and second patterns to detect the plurality of second synchronization elements.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
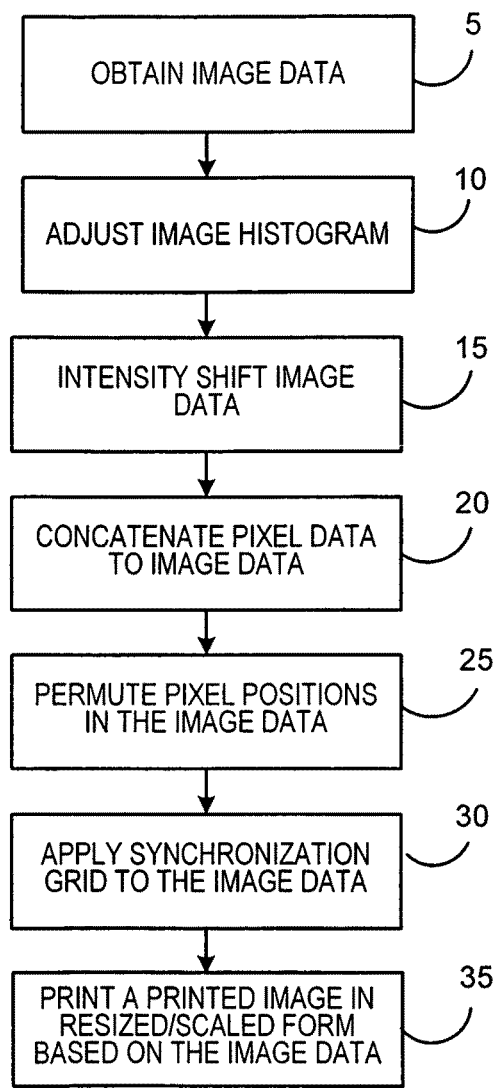
FIG. 1 is a flowchart showing a method of encrypting an image according to one particular, non-limiting embodiment of the invention.
Figure 2A:
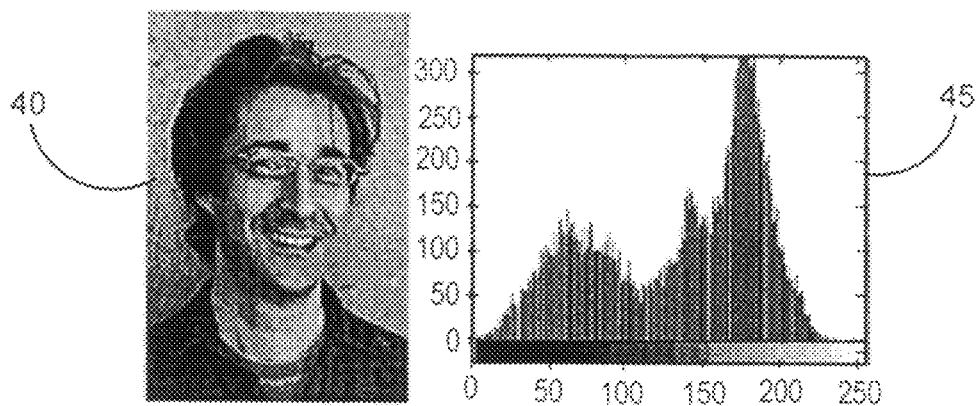
FIGS. 2A-2D are schematic diagrams of exemplary images and image histograms during the various steps of the method of FIG. 1.
Figure 2B:
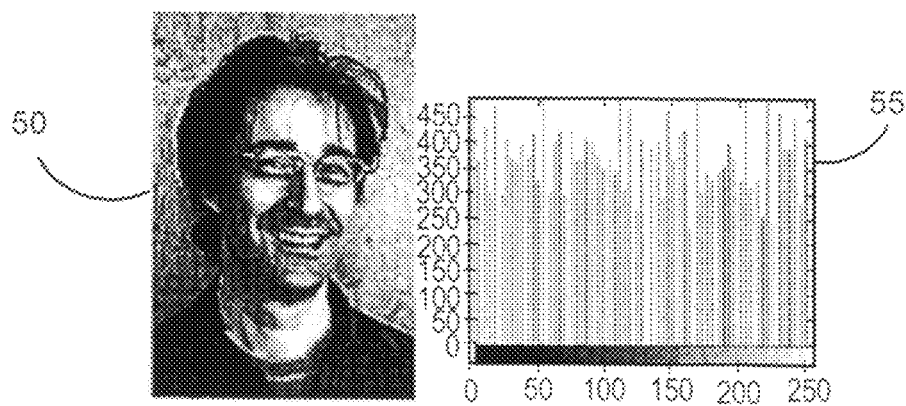

FIG. 1 is a flowchart showing a method of encrypting an image according to one particular, non-limiting embodiment of the invention. As described in greater detail elsewhere herein, the method employs pixel position permutation to scramble the image and make it unrecognizable. The method begins at step 5, wherein the image data for the image to be encrypted by the method is obtained. Preferably, the image data is in the form of a bitmap comprising an array or grid of pixel intensity values (e.g., 8-bit grayscale or RGB color values) arranged in a number of rows and columns which map the pixel values to specific locations in the image. An exemplary image 40 represented by exemplary image data is shown in FIG. 2A. In addition, an image histogram 45 for the image 40 is also shown in FIG. 2A. As is known, an image histogram plots the number of pixels for each intensity (tonal) value in an image. As seen in FIG. 2A, the image histogram 45 is not uniform. Referring again to FIG. 1, at step 10, the image histogram of the received image is adjusted. In the preferred embodiment, this adjusting step comprises histogram specification of the image histogram wherein the pixel intensity value of one or more pixels of the image data is adjusted so that the overall image histogram of the image data approximates, for example, a—given distribution ("histogram matching") or a uniform distribution ("histogram equalization"). A number of suitable algorithms for performing histogram equalization are known and thus will not be described in detail herein. The histogram adjustment step of step 10 is performed so that the original histogram information for the image is hidden and therefore cannot be used by an attacker to decode the image (this is important because the original histogram information is not affected by the pixel position permutation described below in connection with step 25). Since natural images typically have a wide intensity range (as shown in FIG. 2A), the adjustment of the image histogram of the received image in step 10, preferably to a uniform distribution, will not change the perceptual image quality significantly. FIG. 2B shows an exemplary image 50 represented by the exemplary image data used to generate the image 40 in FIG. 2A after histogram equalization has been performed on that data (to thus generate adjusted image data). FIG. 2B also shows an image histogram 55 for the image 50. As seen in FIG. 2B, the image histogram 55 has a generally uniform intensity distribution.

Figure 2C:
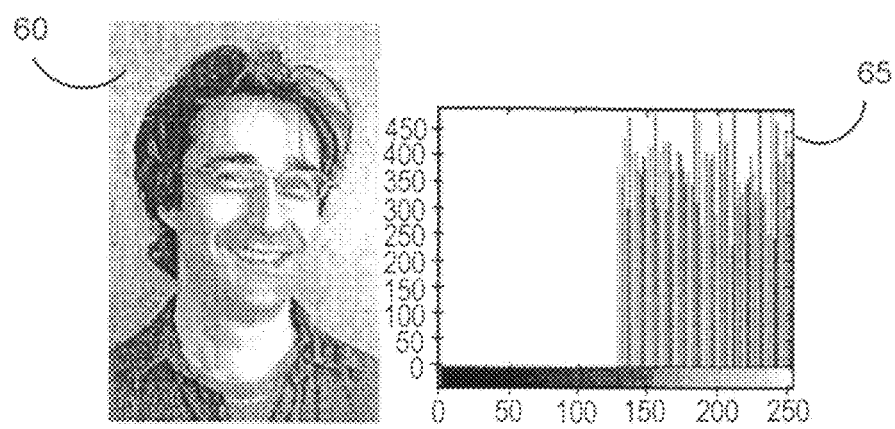

Next, in the illustrated embodiment, the method proceeds to step 15, wherein the adjusted image data is intensity shifted so that only a subset of the original intensity levels are present, thereby to producing further adjusted image data. This may, for example and without limitation, comprise converting the image data from 8-bit data to 6-bit data. Intensity shifting in this manner helps to increase the uniformity of the image histogram. Next, in the illustrated embodiment, the method proceeds to step 20, wherein a number of pixels are concatenated to the current (adjusted) image data to further increase the uniformity of the image histogram (this may be helpful as histogram equalization does not always produce a perfect uniform distribution). As will be appreciated, this will also increase the size of the image. FIG. 2C shows an exemplary image 60 represented by the exemplary image data used to generate the image 50 in FIG. 2B after the intensity shifting step has been performed on that data. FIG. 2C does not show the pixel concatenation. As will be appreciated, such concatenated pixels if shown may appear as a rectangle to the right of the exemplary image 60 shown in FIG. 2C. FIG. 2C also shows an image histogram 65 for the image 60. As seen in FIG. 2C, the image histogram 65 has a generally uniform and intensity shifted distribution.

Preferably, the distribution (histogram) of the added pixels is chosen so as to complement the distribution of the existing image (to improve histogram specification). Also, once the distribution of the added pixels is fixed, the way in which they are added really does not matter since, as described elsewhere herein, they will be shuffled around anyway. In one embodiment, the pixels could be added randomly. Alternatively, the pixels could have been added "bands" one level after the other, creating some kind of gradient effect. As a further alternative, these added pixels could be used to encode some data, like some written text appearing beside the image.

Figure 3:
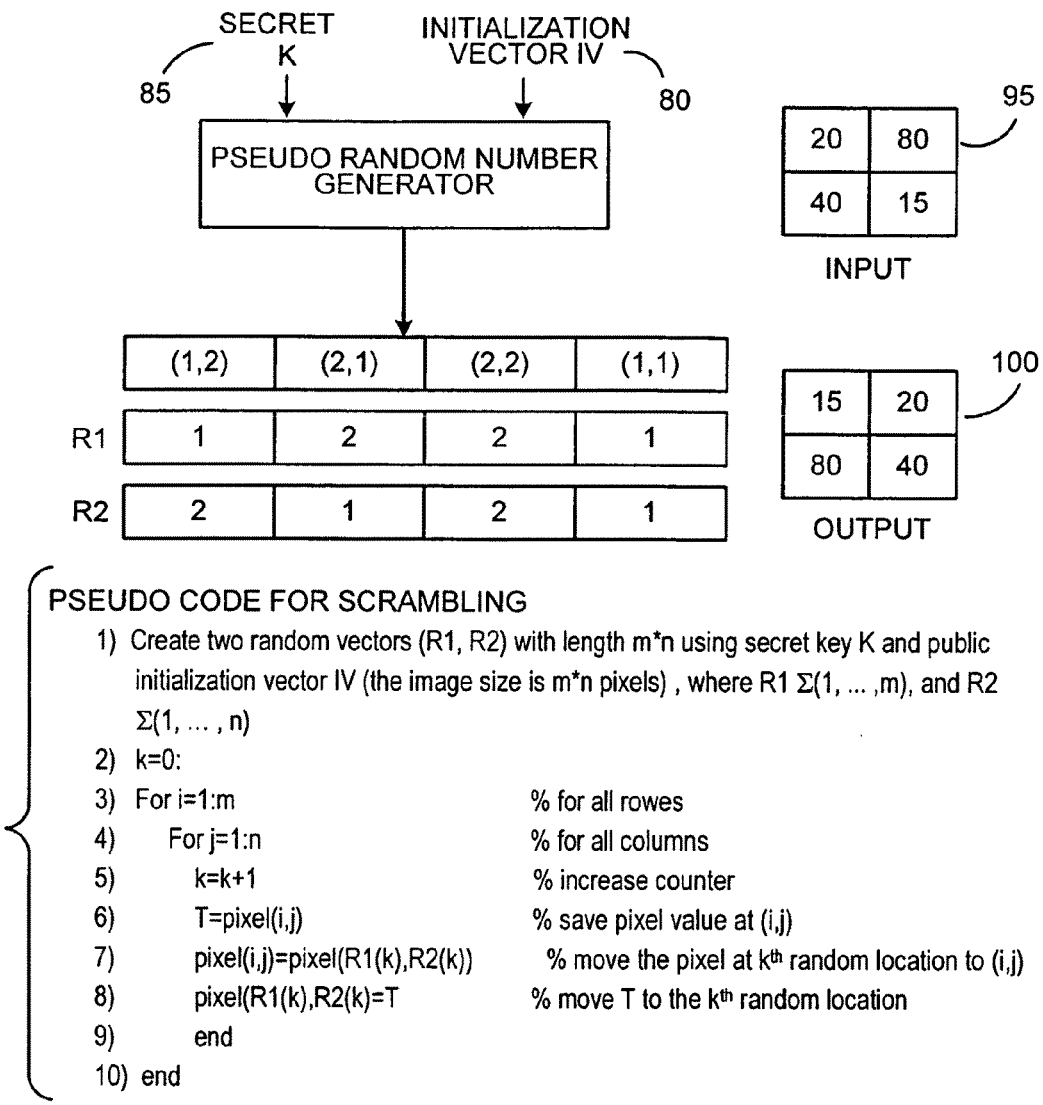
FIG. 3 is a schematic illustration of a particular preferred permutation process that may be used to implement the permutation step of FIG. 1.

Next, at step 25, the pixel positions of a plurality of, and preferably all of, the pixels in the current image data are permuted in order to make the image unrecognizable. In the preferred embodiment, the pixel position permutation of step 25 is performed as a complete permutation process using an initialization vector IV, a secret key K and a pseudo random number generator in the following manner. For all rows and columns of the image data, each individual pixel is swapped with another pixel at a randomly chosen location. This is done until all the image pixel positions are swapped with others. The time complexity of the scrambling algorithm is O(m*n), where m and n are the number of rows and columns of the image data, respectively. The security of the permutation algorithm relies on the security of the pseudo random number generator used to swap image pixels. To ensure a wide range key space, block cipher encryption, such as AES, can be used to produce a long pseudo random number sequence to permute pixel positions. The pseudo random numbers used for position permutation should be unique for each encrypted image. Therefore, a public unique initialization vector IV is assigned to each image at the encoder part. The initialization vector IV and shared secret key K are then used together to create a unique pseudo random sequence for different images. FIG. 3 is a schematic illustration of a particular preferred permutation process that may be used to implement step 25. FIG. 3 shows an initialization vector IV 80, a secret key K 85, a pseudo random number generator 90, random vectors R1 and R2, sample input image data 95, sample output image data 100, and pseudo code 105 for implementing the illustrated process.

Figure 2D:
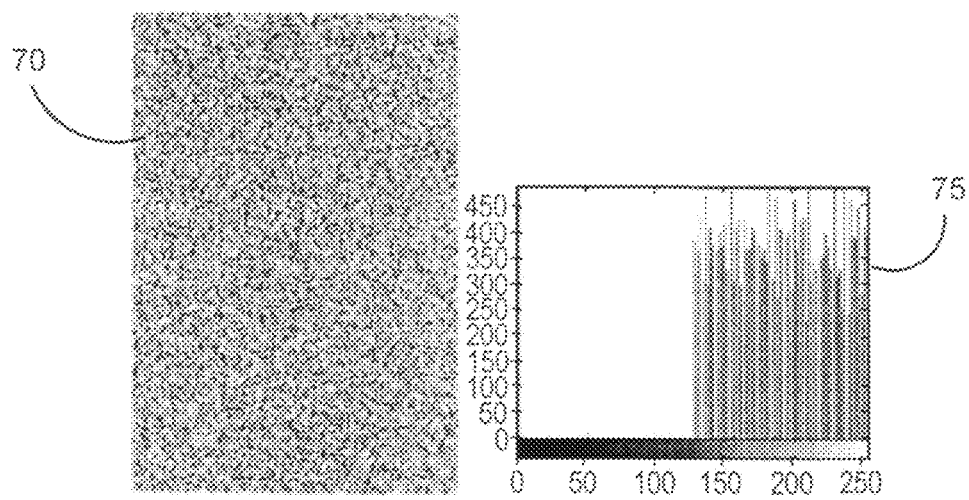

FIG. 2D shows an exemplary image 70 represented by the exemplary image data used to generate the image 60 in FIG. 2C after the pixel permutation step has been performed on that data. FIG. 2D also shows an image histogram 75 for the image 70. As seen in FIG. 2D, the image histogram 75 is the same as the image histogram 65 of FIG. 2C. As also seen in FIG. 2D, the original image is no longer recognizable.

Figure 4:
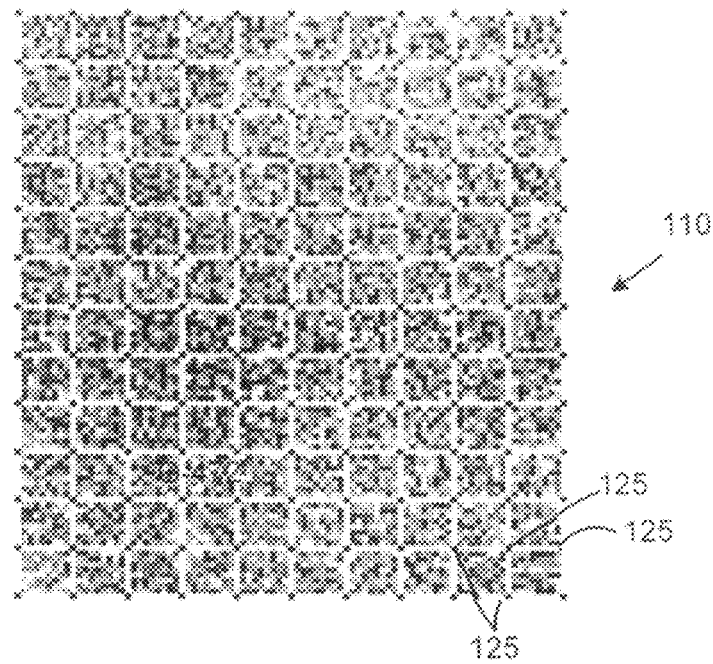
FIGS. 4 and 5 show an exemplary encrypted image that may be generated by the method of FIG. 1.
Figure 5:
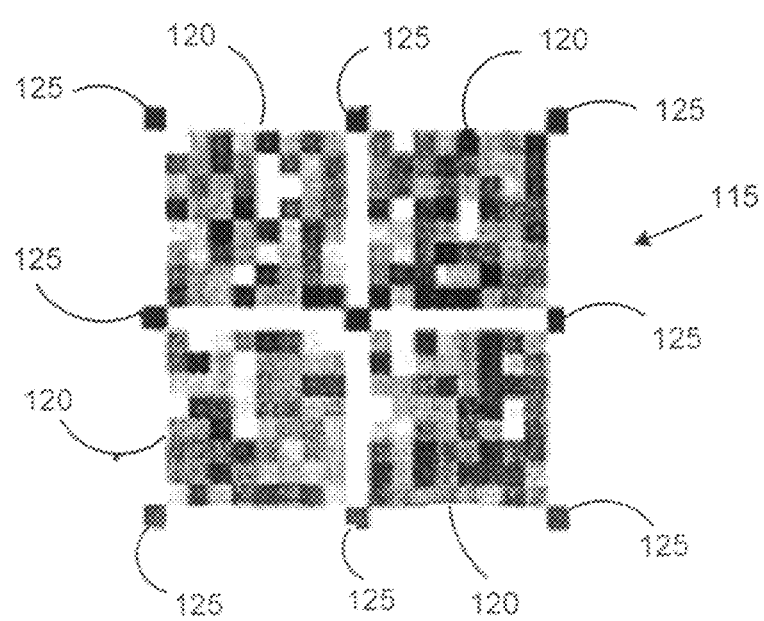

Next, referring again to FIG. 1, the method proceeds to step 30, wherein a synchronization grid is applied to the current image data (the permuted image data). As described in greater detail elsewhere herein, the synchronization grid helps in locating the pixel positions after print-and-scan operations have been performed. This is important because the scheme described herein is sensitive to geometric deformations and all pixels in the original image should match exactly to corresponding pixel positions in the scanned data after printing and scanning has been performed. This can be achieved by separating and grouping the individual pixels in the current image data into image sub-blocks by putting them into a grid with a known structure. FIGS. 4 and 5 show once such exemplary grid structure wherein the pixels are grouped into 8 pixel by 8 pixel blocks 120 defined and separated by black synchronization dots 125 (FIG. 4 shows the entire exemplary image 110 and FIG. 5 shows a portion 115 of the image 110 comprising four adjacent 8 pixel by 8 pixel blocks 120). Since the two entities involved in implementing the encryption and decryption scheme described herein, namely the encoder that encrypts the image and the decoder that decrypts the encrypted image to obtain the original, will share the grid structure, the encrypted image can be easily scanned and decoded as described elsewhere herein.

Referring again to FIG. 1, at step 35 of the illustrated embodiment, a printed image in a resized/scaled form is printed based on the current image data (permuted image data) with the applied synchronization grid. The resizing/scaling is done in the illustrated embodiment in order to compensate for the lossy nature of the print-and-scan channel. In other words, at step 35, instead of printing one dot per pixel, w*w dots are printed, where w is the resizing/scaling factor. This is equivalent to increasing the image size by factor w before printing. For example, if the scaling factor is w=3, each pixel is printed 9 times in a 3×3 dots square cell. This is done because if only one dot is printed for each pixel, the reading error in the scanning portion (described elsewhere herein) might become significantly high.

As will be appreciated, the printed encrypted image will be able to be printed in a relatively small region (solving the size problem imposed by two-dimensional barcode implantations described elsewhere herein). In other words, with the present invention, more information can be printed into a smaller region as compared to two-dimensional barcodes, and thus the printed encrypted image of the present invention will be smaller than and take up less space than a two-dimensional barcode that includes the same original image.

It is to be understood that the particular embodiment of the method shown in FIG. 1 is meant to be exemplary and that alternative embodiments are possible without departing from the scope of the present invention. For example, in one particular alternative embodiment, step 20 can be omitted (i.e., extra random pixels will not be added). In that embodiment, the pixel position permutation of step 25 will immediately follow the image histogram adjustment of step 10 and intensity shifting of step 15. In another particular alternative embodiment, both step 15 and step 20 can be omitted, in which case only the image histogram adjustment of step 10 is performed prior to the pixel position permutation of step 25. In still another alternative, the resizing/scaling of step 35 can be omitted. As will be appreciated, still further variations are also possible.

Figure 6:
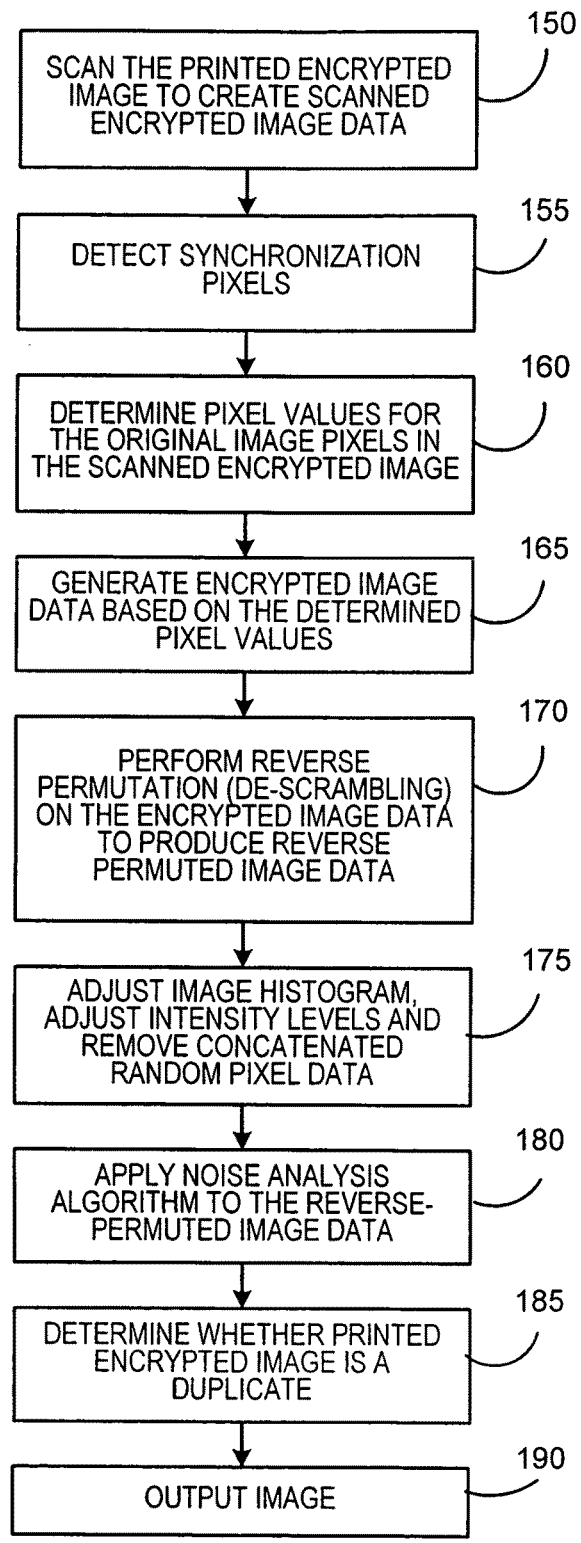
FIG. 6 is a flowchart showing a method of decrypting an image according to one particular, non-limiting embodiment.
Figure 7:
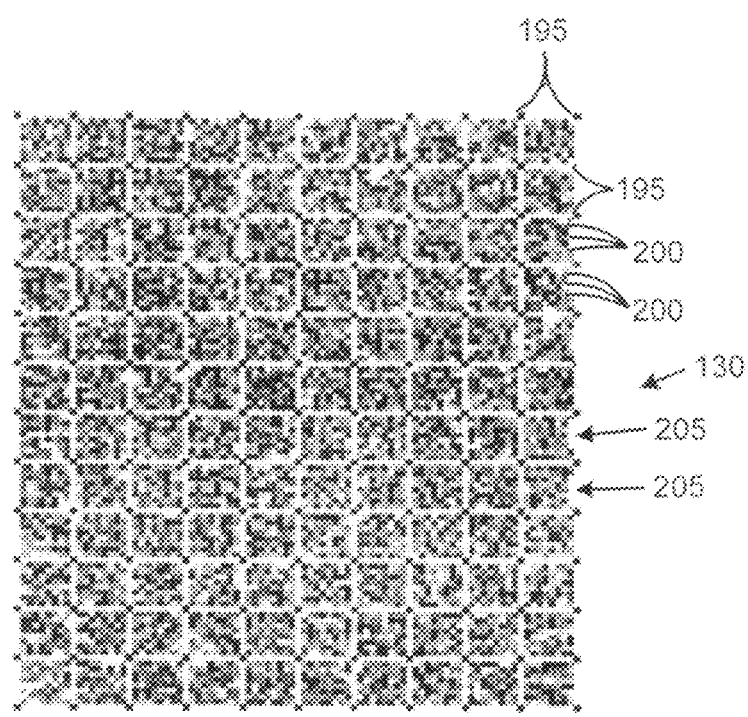
FIG. 7 shows an exemplary image represented by exemplary scanned encrypted image data generated in the method of FIG. 6 up to step 165 thereof.

FIG. 6 is a flowchart showing a method of decrypting a printed encrypted image, e.g., an image that was encrypted and printed according to the method shown in FIG. 1, according to one particular, non-limiting embodiment. The method beings at step 150, wherein the printed encrypted image (e.g., see FIG. 4) is scanned to create scanned encrypted image data. An exemplary image 130 represented by exemplary scanned encrypted image data generated by step 150 is shown in FIG. 7. That exemplary image 130 and the associated scanned encrypted image data will be used in the following description to illustrate the present invention. In the preferred embodiment, the scanning of step 150 is performed as follows. First, it is assumed that the scanner end knows the image scaling factor and printing resolution that was used to generate the printed encrypted image. Based on this information, the printed encrypted image is scanned with a scan resolution that is higher than the print resolution. Thus, following the scanning, one pixel in the original image will correspond to N*N pixels in the scanned encrypted image, where N=(scaling factor)*(scanning resolution/printing resolution). For example, assume that a printed encrypted image was created using a printing resolution of 200 dpi and a scaling factor of w=3. Further assume that in this example the scanning resolution used to perform step 150 is 600 dpi. In this example, N is 3*600/200=9, meaning that one pixel in the original image will correspond to 9×9=81 scanned pixels.

Figure 8:
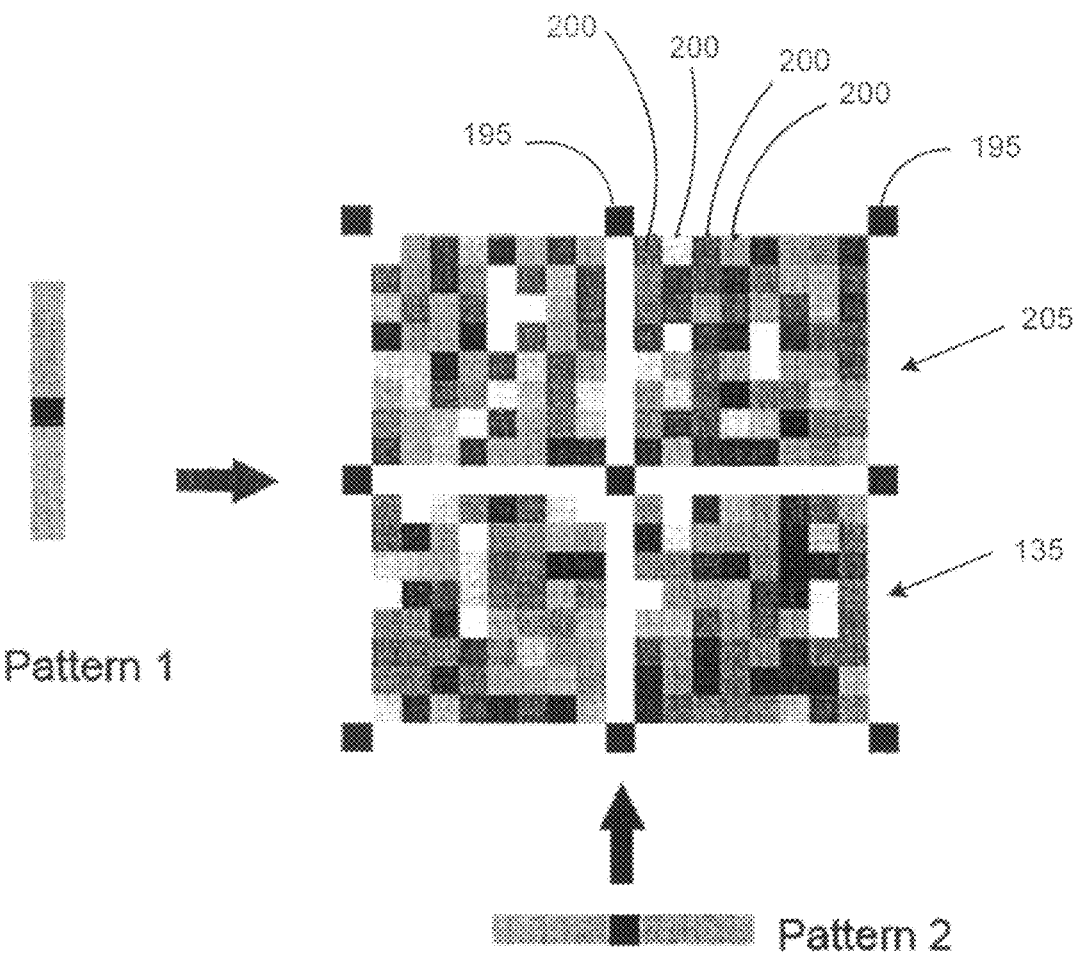
FIG. 8 shows a portion of an exemplary image represented by scanned encrypted image data and patterns used to search over the scanned encrypted data.

It will be appreciated that following step 150, the scanned encrypted image data will comprise two types of scanned pixels: synchronization pixels arranged in synchronization pixel groups 195 representing the synchronization dots 125 (FIGS. 4 and 5) and original image pixels arranged in original image pixel groups 200 representing the scrambled (permuted) pixels from the image data processed during the encryption steps of FIG. 1 (the original image pixel groups 200 are arranged in blocks 205). In particular, each synchronization pixel group 195 will correspond to a respective one of the synchronization dots 125 of the printed encrypted image, and each original image pixel group 200 will correspond to a respective one of the scrambled (permuted) pixels from the image data processed during the encryption steps of FIG. 1. As will be appreciated, it will be necessary to separate the synchronization pixel groups 195 from the original image pixel groups 200 before further processing can be performed. Thus, following step 150, the method proceeds to step 155, wherein the synchronization pixel groups 195 are detected. In the preferred embodiment, the synchronization pixel groups 195 are detected by a pattern detection algorithm. Specifically, the detection is realized by searching a vertical pattern (Pattern 1) and a horizontal pattern (Pattern 2) as shown in FIG. 8 over the scanned encrypted image 130 (only a portion 135 of which is shown). The pattern search is done by normalized cross-correlation. The local maxima points in the cross-correlation output give the positions of the synchronization pixel groups 195. To detect these positions precisely, the cross-correlation outputs for the vertical pattern and the horizontal pattern are multiplied by an entrywise/Hadamard product. The new cross-correlation image is applied to an empirically determined threshold (e.g., TH=0.65) to get the synchronization pixel groups 195 in binary form. In the binary image, each "synchronization group" position is located by computing the centroid of the "synchronization group" region.

Figure 9:
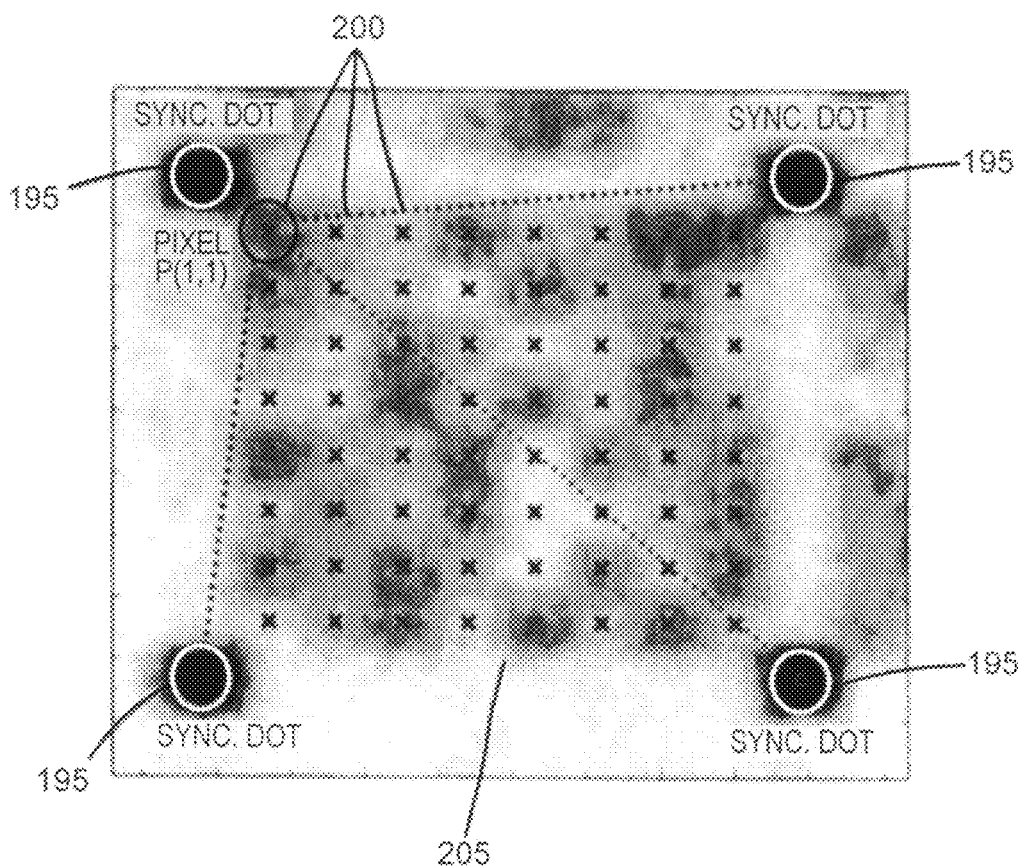
FIG. 9 shows a pixel block of an exemplary image represented by scanned encrypted image data including the original image pixel groups thereof.
Figure 10:
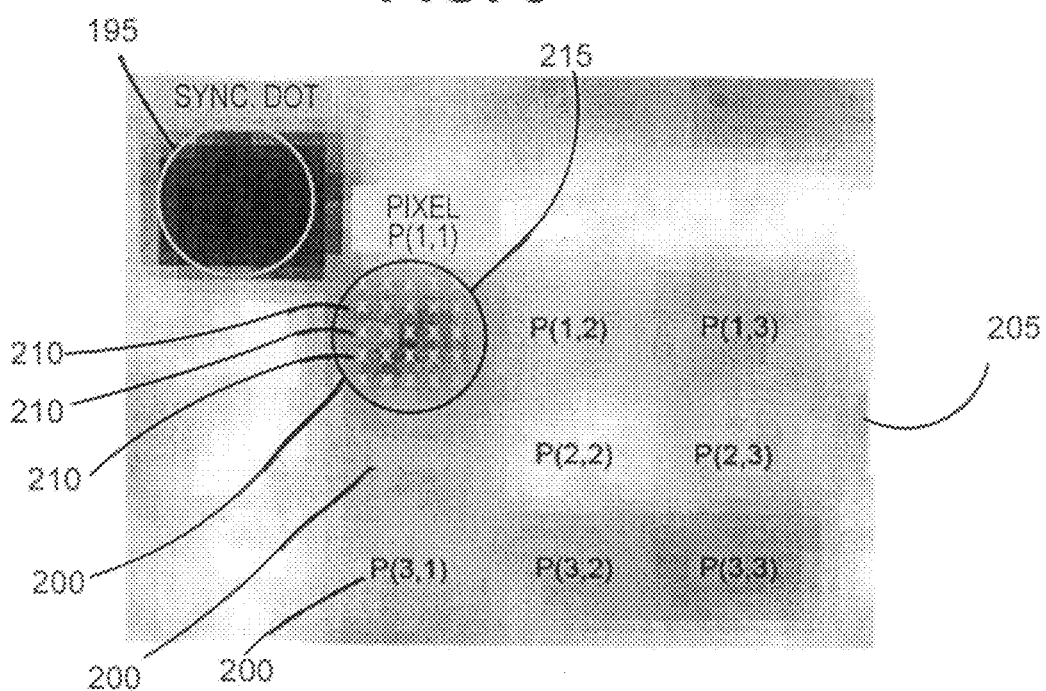
FIG. 10 shows a portion of the pixel block of FIG. 9 and the scanned pixel data that is used to generate an intensity value for the exemplary original image pixel group shown therein.

Once the synchronization pixel groups 195 are detected in step 155, the method proceeds to step 160, wherein a pixel intensity value for each of the original image pixel groups 200 in the scanned encrypted image data is determined. Preferably, this is performed as follows. First, each synchronization pixel group 195 is used to locate the nearest pixel blocks 205. Each synchronization pixel group 195 can be used locate the closest pixel blocks 205 in four directions, up=left, up-right, down-left and down right. One such pixel block 205 is shown in FIG. 9. Then, the position of each individual original image pixel group 200 in each pixel block 205 is estimated in the following manner (one particular original image pixel group 200, further identified as a pixel P(1,1) in FIGS. 9 and 10, is used for illustrative purposes). First, d1, d2, d3, and d4 are established as position vectors of the four synchronization pixel groups 195 closest to the pixel P(1,1) in the block 205. By using d1, d2, d3 and d4, the position of the pixel P(1,1) is estimated as vectors e1, e2, e3, and e4. Then, the position of the pixel P(1,1) is computed by averaging the e1, e2, e3, and e4 vectors as follows: Position(P(1,1))=(e1+e2+e3+e4)/4. Note that Position(P(1,1)), e1, e2, e3 and e4 are all vectors in Cartesian coordinates. In FIG. 9, the final estimated position for each original image pixel group 200 in the pixel block 205 that is shown is indicated by an X.

Once the position of each original image pixel group 200 (e.g., the pixel P(1,1)) is determined, the intensity value of the original image pixel group 200 is estimated by averaging all adjacent scanned pixels 210 that make up the original image pixel group 200 within a predetermined radius 210 (e.g., a 2 or 3 scanned pixel radius) of the determined location (since, as discussed elsewhere herein, the scan resolution is greater than the print resolution, each original image pixel group 200 will comprise multiple scanned pixels 210 (each marked with an X) as seen in FIG. 10). Averaging in this manner is preferred as it reduces the channel (print-and-scan) noise variance significantly. Alternatively, a weighted average may be used.

Once the pixel intensity value of each original image pixel group 200 is determined, the method proceeds to step 165, wherein the position and intensity values are used to construct encrypted image data that will be used in further processing. Preferably, the encrypted image data will comprise a bitmap having an array or grid of pixel intensity values. Next, at step 170, reverse permutation is performed on the encrypted image data created in step 165 in order to descramble the original image pixel groups 200 (in particular the determined pixel intensity values) and thereby create reverse-permuted image data. In particular, the random vectors R1 and R2 used in the encryption (scrambling) step are generated from the secret key K and the initialization vector IV. Thus, as will be appreciated, if the secret key K is not available, decryption cannot be performed. The random vectors R1 and R2 are then reversed (the random sequence order in each is reversed), and the same scrambling algorithm (e.g., FIG. 3) is run with the reversed vectors R1 and R2. Swapping the pixel positions in reverse order as just described descrambles and decodes (decrypts) the image.

After the reverse permutation is performed and the encrypted image data is descrambled to form the reverse-permuted image data, the method proceeds to step 175, wherein the image histogram and the intensity levels of the reverse-permuted image data is adjusted to reverse the adjustments that were performed in steps 10 and 15 of FIG. 1. In addition, the concatenated random pixel data that was added in step 20 of FIG. 1 is removed.

Furthermore, according to an aspect of an embodiment of the invention, a copy detection/protection feature is provided that is based on print-and-scan channel noise. In particular, following step 175, the method proceeds to step 180, wherein a noise analysis algorithm, such as an algorithm based on wavelet transforms or another suitable algorithm, is applied to the current reverse-permuted image data to estimate the print-and-scan channel noise power (noise residue). As is known, channel noise increases monotonically at each print-and-scan operation. Based on this fact, a noise threshold can be set with a particular printer, paper and scanner setting. If the noise power obtained from the current reverse-permuted image data exceeds the noise threshold, it can be assumed that the current reverse-permuted image data was based on a potentially illegitimate duplicate (i.e., the printed encrypted image used in step 150 was a duplicate). Thus, at step 185, a determination as to whether the printed encrypted image is a duplicate is made and preferably the result of the determination is reported to the user. Then, at step 190, an image is output.

Figure 11A:
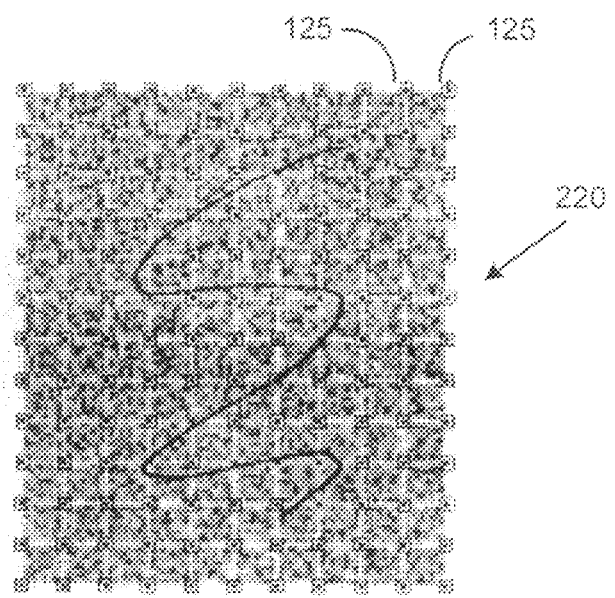
FIGS. 11A, 11B, 11C, 12A, 12B and 12C show damaged printed encrypted images and associated images represented by scanned image data and together demonstrate correction for missing synchronization dots.
Figure 11B:
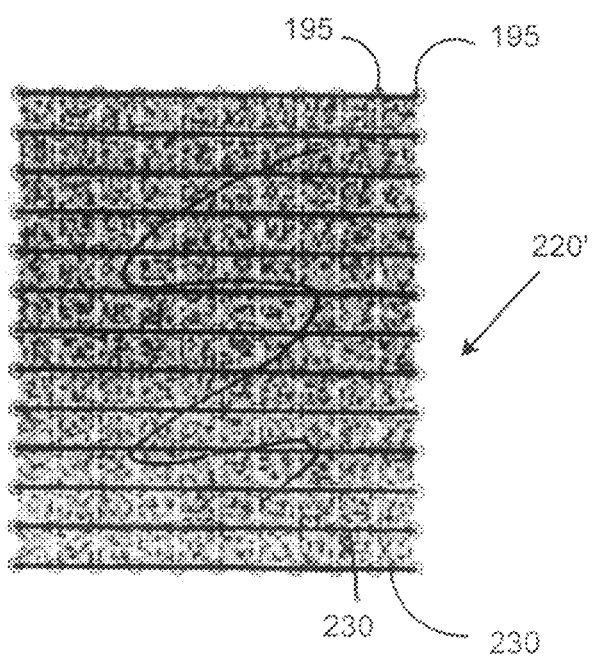
Figure 11C:
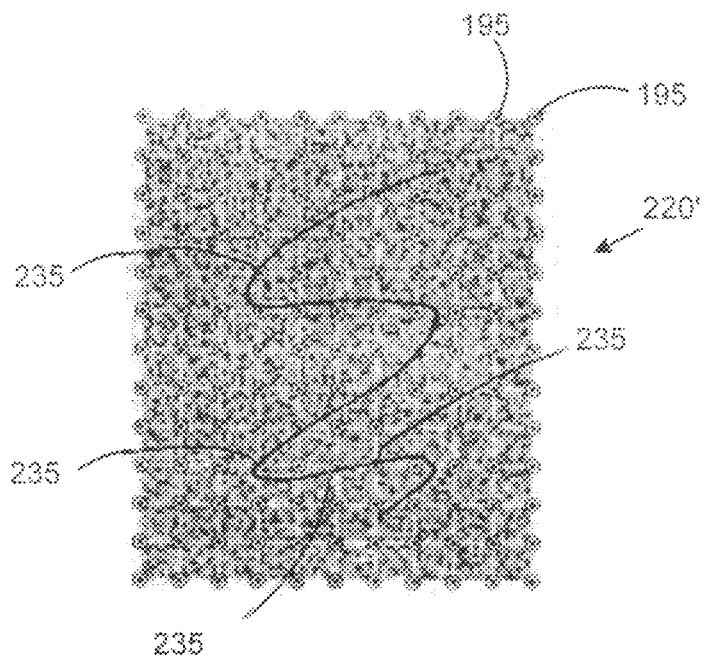
Figure 12A:
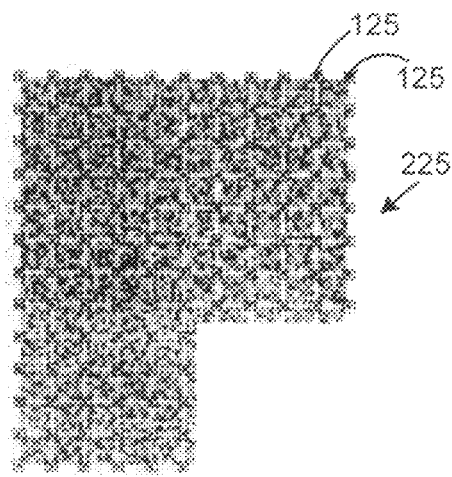
Figure 12B:
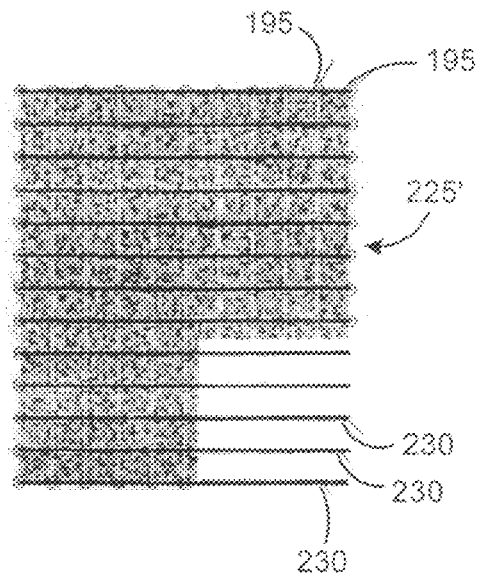
Figure 12C:
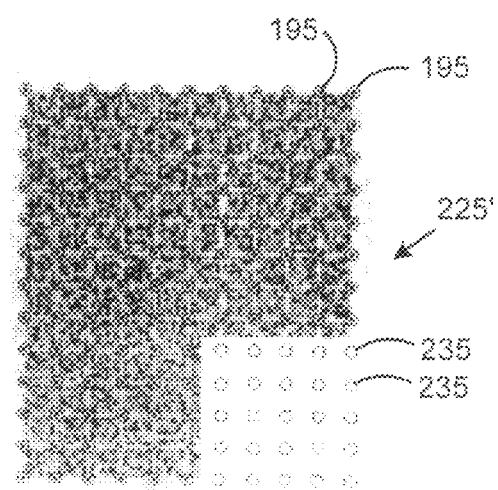
Figure 13A:
FIGS. 13A and 13B show damaged printed encrypted images generated in accordance with the present invention and the decrypted images resulting therefrom.
Figure 13B:
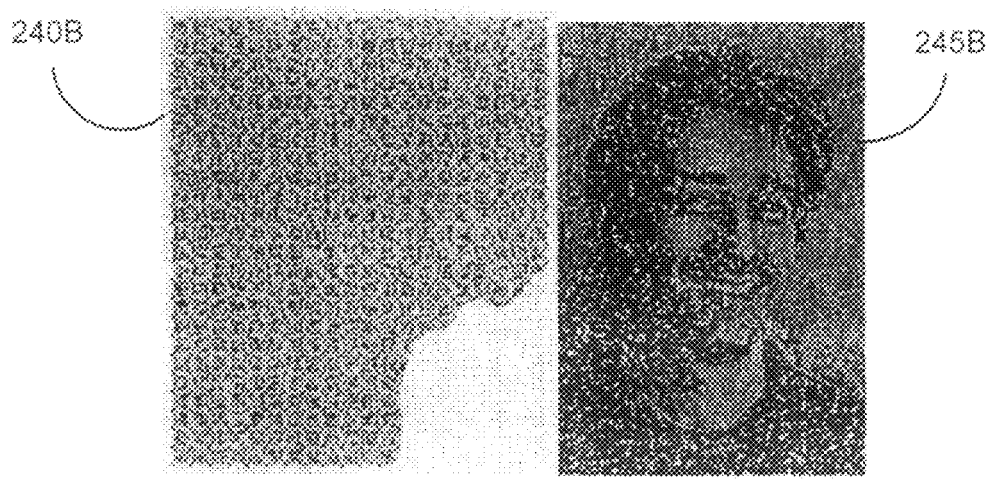

It is important to note that with the present invention, even if some part of a printed encrypted image is damaged or corrupted, with the help of the synchronization dots 125, missing pixel positions can be estimated in the scanned image data. For example, FIGS. 11A and 12A show two damaged printed encrypted images 220 and 225, respectively. During the scanning process described herein, some synchronization dots 125 in each image 220, 225 will not be able to be read because of damaged regions. These missing synchronization dots 125 may be estimated in the scanned image data represented by scanned images 220' and 225' by line equations fit to synchronization pixel groups 195 in the same grid row as illustrated in FIGS. 11B and 12B. Once row lines 230 are fit into the grid as shown in FIGS. 11B and 12B, missing synchronization pixel groups 235 on the lines 230 may be estimated. Thereafter, the method may proceed from step 160 of FIG. 6 as described above. FIGS. 13A and 13B show damaged printed encrypted images 240A and 240B and the decrypted images 245A and 245B resulting therefrom. As can be seen in FIGS. 13A and 13B, when the reverse-permutation is applied, any missing pixel values are scattered all over the image. Thus, if the amount of corruption is not significant, the original image can still be recognized despite the missing/corrupted region. Moreover the noisy effect of such scattered missing or obliterated pixels can be significantly reduced by using known de-noising techniques such as median filtering.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for printing an image, comprising:
receiving image data based on an image, said image data comprising a plurality of pixels, each having a corresponding position and pixel value data;
adjusting an image histogram of said image data to modify said image and create image data that is adjusted;
permuting a plurality of said pixel positions using at least a secret key to create image data that is permuted; and
printing the adjusted and permuted image data using a printer;
wherein said permuting comprises pseudo-randomly permuting said image data using a relatively long pseudo random number sequence created using the secret key, an initialization vector and a pseudo random number generator to create the image data that is permuted.

2. The method according to claim 1, wherein said adjusting said image histogram comprises applying histogram specification techniques to said image data.

3. The method according to claim 2, wherein applying histogram specification techniques comprises at least one technique selected from the group consisting of lossy histogram matching and lossy histogram equalization.

4. The method according to claim 1, wherein said adjusting said image histogram comprises intensity shifting said image data.

5. The method according to claim 1, wherein said adjusting said image histogram comprises concatenating additional pixels having corresponding pixel data to said image data.

6. The method according to claim 5, wherein the concatenated pixels are used to encode additional data not present in the image data.

7. The method according to claim 1, further comprising scaling said adjusted and permuted image data to produce scaled image data, and wherein printing said adjusted and permuted image data comprises printing said scaled image data.

8. The method according to claim 1, wherein said permuting comprises permuting all of said pixel locations.

9. A method for printing an image, comprising:
receiving image data based on an image, said image data comprising a plurality of pixels, each having a corresponding position and pixel value data;
adjusting an image histogram of said image data to modify said image and create image data that is adjusted;
permuting a plurality of said pixel positions using at least a secret key to create image data that is permuted;
printing the adjusted and permuted image data using a printer; and
applying a synchronization grid to said adjusted and permuted image data to generate synchronized image data, and wherein printing said adjusted and permuted image data comprises printing said synchronized image data.

10. The method according to claim 9, wherein said synchronization grid comprises a plurality of synchronization elements.

11. An image decryption method, comprising:
scanning a printed image to create scanned image data, said printed image being generated from permuted image data, wherein said permuted image data is generated by permuting a plurality of first pixel values of first image data using at least a secret key;
obtaining a plurality of second pixel values from said scanned image data; and
reverse-permuting a plurality of said second pixel values using at least said secret key to create reverse-permuted scanned image data;
wherein said permuted image data is generated by randomly permuting the plurality of first pixel values using the secret key, and initialization vector and a pseudo random number generator, and wherein said reverse-permuting comprises reverse-permuting said plurality of said second pixel values using said secret key and said initialization vector.

12. The method according to claim 11, wherein said reverse-permuted scanned image data has an image histogram, the method further comprising adjusting the image histogram to generate adjusted scanned image data.

13. The method according to claim 11, wherein the printed image is printed with a print resolution, and wherein the scanning comprises scanning the printed image to create scanned image data using a scan resolution that is higher than said print resolution.

14. An image decryption method, comprising:
scanning a printed image to create scanned image data, said printed image being generated from permuted image data, wherein said permuted image data is generated by permuting a plurality of first pixel values of first image data using at least a secret key;
obtaining a plurality of second pixel values from said scanned image data;
reverse-permuting a plurality of said second pixel values using at least said secret key to create reverse-permuted scanned image data;
applying a noise analysis algorithm to one of the reverse-permuted scanned image data or second data that is based on the reverse-permuted scanned image data to determine a noise power, determining whether said noise power exceeds a predetermined threshold, and if it is determined that said noise power exceeds the predetermined threshold, determining that said printed image is a duplicate.

15. The method according to claim 14, further comprising applying de-noising to one of the reverse-permuted scanned image data or second data that is based on the reverse-permuted scanned image data.

16. An image decryption method, comprising:
scanning a printed image to create scanned image data, said printed image being generated from permuted image data, wherein said permuted image data is generated by permuting a plurality of first pixel values of first image data using at least a secret key;
obtaining a plurality of second pixel values from said scanned image data; and
reverse-permuting a plurality of said second pixel values using at least said secret key to create reverse-permuted scanned image data;
wherein said printed image includes a first synchronization grid having a plurality of first synchronization elements, wherein said scanned image data includes a second synchronization grid having a plurality of second synchronization elements, wherein said method further comprises detecting a plurality of second synchronization elements, wherein said obtaining a plurality of second pixel values comprises using said plurality of second synchronization elements to identify a plurality of second pixel locations, each of said second pixel locations corresponding to a respective one of said second pixel values.

17. The method according to claim 16, wherein said obtaining a plurality of second pixel values comprises, for each of the plurality of second pixel locations, averaging pixel data from said scanned image data that is associated with the second pixel location to determine the second pixel value that corresponds to the second pixel location.

18. The method according to claim 16, wherein said averaging comprises averaging pixel data from said scanned image date that is within a predetermined radius of the second pixel location.

19. The method according to claim 16, wherein detecting a plurality of second synchronization elements employs normalized cross-correlation using first and second patterns to detect the plurality of second synchronization elements.

20. The method according to claim 16, wherein the plurality of second synchronization elements comprises all of said second synchronization elements.

21. An image scanning method, comprising:
scanning a partially corrupted printed image to create scanned image data, said partially corrupted printed image being generated from at least partially permuted image data and missing image data, wherein said permuted image data and missing image data is generated by at least partially permuting said data using at least a secret key;
estimating said missing image data by assigning missing pixels;
 combining said scanned image data and missing image data to create estimated scanned image data;
reverse-permuting the estimated scanned image data; and;
de-noising the reverse-permuted estimated scanned image data.

* * * * *